United States Patent [19]

Suzuki et al.

[11] Patent Number: 4,664,215

[45] Date of Patent: May 12, 1987

[54] SHAFT DRIVE FOR BALLOON TIRED MOTORCYCLE

[75] Inventors: Takashi Suzuki, Fukuroi; Hiroshi Kasai, Kakegawa, both of Japan

[73] Assignee: Yamaha Hatsudoki Kabushiki Kaisha, Iwata, Japan

[21] Appl. No.: 834,608

[22] Filed: Feb. 28, 1986

[30] Foreign Application Priority Data

Mar. 4, 1985 [JP] Japan .................. 60-41205

[51] Int. Cl.$^4$ ............. B62M 17/00; B62K 11/00
[52] U.S. Cl. ........................... 180/226; 180/219
[58] Field of Search ............ 180/226, 219; 280/260, 280/281 W

[56] References Cited

U.S. PATENT DOCUMENTS 1,952,091 3/1934 Nicholson .................. 180/226

4,436,173 3/1984 Takashi ..................... 180/226

FOREIGN PATENT DOCUMENTS 49-27375 7/1974 Japan .
58-131853 7/1983 Japan .

Primary Examiner—John J. Love
Assistant Examiner—Donn McGiehan
Attorney, Agent, or Firm—Ernest A. Beutler

[57] ABSTRACT

An improved drive arrangement for an off the road motorcycle having a balloon tired rear wheel that has a width at least equal to the width of the vehicle frame. The rear wheel is driven from an engine output shaft by a drive shaft that is contained within a trailing arm that supports the rear wheel and which has an angularly disposed portion for transferring the drive from an inwardly placed engine output shaft to an outer location on the rear wheel.

4 Claims, 3 Drawing Figures

SHAFT DRIVE FOR BALLOON TIRED MOTORCYCLE

BACKGROUND OF THE INVENTION

This invention relates to a shaft drive for balloon tired motorcycles and more particularly to an improved driving arrangement for such vehicles.

Recently, it has been proposed to equip motorcycles with large, low pressure balloon tires to adapt them for off the road use. The use of such low pressure tires (tires having pressures in the range of 0.1 to 0.2 kg/cm$^2$) has great advantages for off the road use. However, certain problems arise in connection with driving the rear wheel. Since the engine and transmission is normally mounted by the frame in a location between the rider's legs, the manner of transmitting drive from the engine output shaft to a rear wheel which may be at least as wide or wider than the frame presents certain difficulties. That is, it the engine output shaft is extended laterally outwardly and either a straight drive shaft or chain drive is employed, the rider's leg position becomes extremely awkward.

In order to offset these deficiencies, it has been proposed to employ a drive arrangement that incorporates an intermediate shaft, one end of which is driven by an inwardly positioned chain from the engine output shaft and the other end of which drives the rear wheel through an outwardly positioned chain. An example of such a chain drive is shown in copending application Ser. No. 632,717, filed July 20, 1984 in the name of Nobuaki Shiraishi, entitled "Offroad Running Motorcycle" and assigned to the same assignee as this application. Although such a drive offsets the deficiencies noted above, it itself has certain difficulties. For example, it is difficult to provide an adjustment for each of the chains. In addition, this type of arrangement has certain other disadvantages inherent with chain drives.

It is, therefore, a principal object of this invention to provide an improved driving arrangement for off the road motorcycles.

It is a yet further object of this invention to provide an improved shaft drive for motorcycles having balloon tired rear wheels.

SUMMARY OF THE INVENTION

This invention is adapted to be embodied in a vehicle having frame means, a dirigible front wheel supported by said frame means, power means supported by said frame means and driving an output shaft, and a rear wheel journaled by said frame means and carrying a low pressure balloon tire having a width at least equal to the width of the frame means. In accordance with the invention, means are provided for driving the rear wheel from the output shaft including a drive shaft having at least a portion that is rotatable about an axis that is disposed at an angle to a longitudinal plane passing through the center of the rear wheel in plan view.

DETAILED DESCRIPTION OF THE PREFERRED EMBODIMENT

Figure 1:
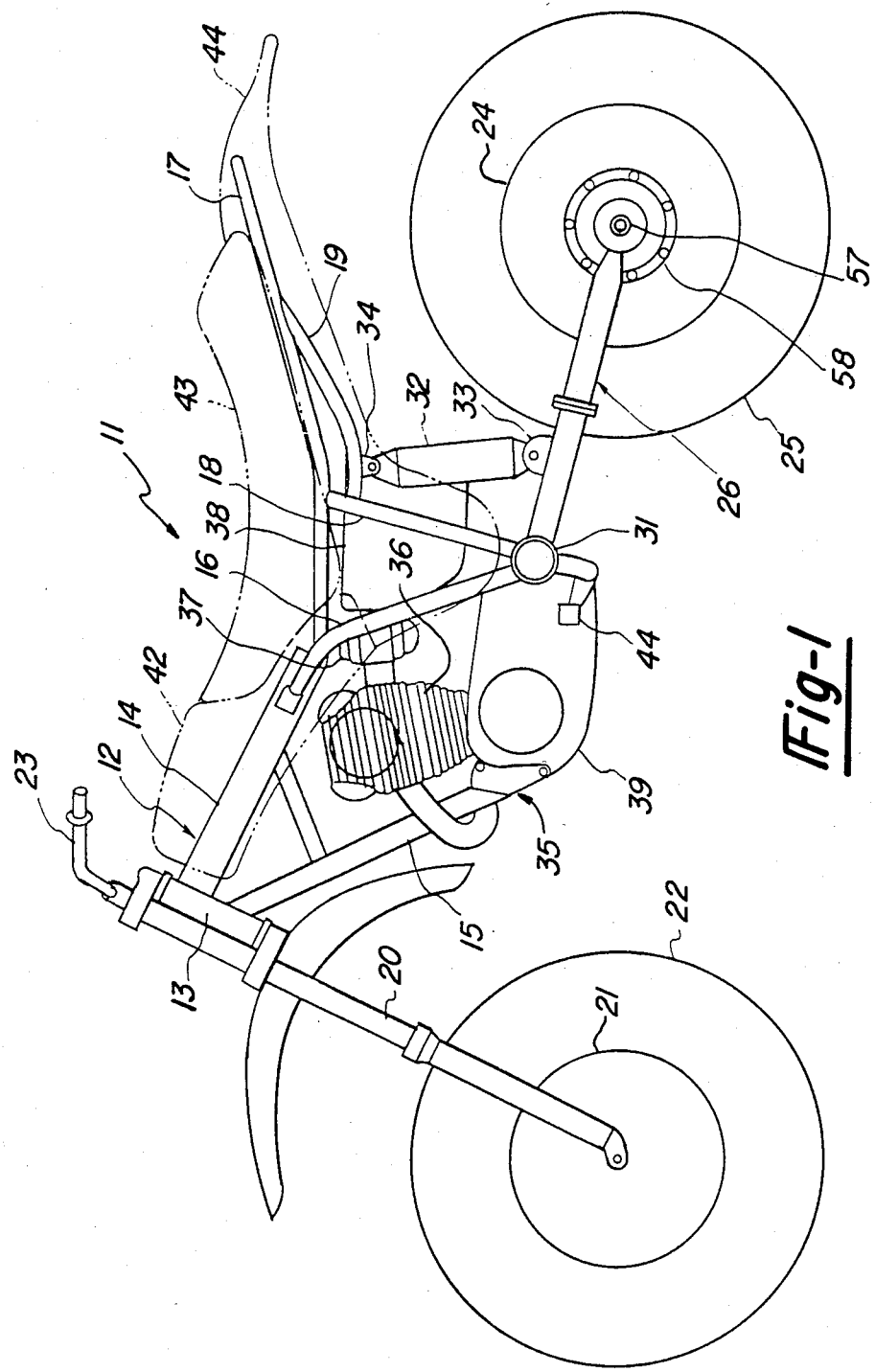
FIG. 1 is a side elevational view of a motorcycle constructed in accordance with an embodiment of the invention, with portions shown in phantom.

A motorcycle constructed in accordance with the invention is identified generally by the reference numeral 11. The motorcycle 11 includes a frame assembly, indicated generally by the reference numeral 12 and which may be of the welded up type. In the illustrated embodiment, the frame assembly 12 includes a head pipe 13 from which a main tube 14 extends. In addition, a pair of down tubes 15 are affixed to the head pipe 13 and extend downwardly and rearwardly. A pair of back stays 16 are affixed to the rear end of the main tube 14 and extend downwardly. Seat rails 17 are affixed to the back stays 16 and extend rearwardly. The seat rails 17 are integrally joined at their rear ends and are supported intermediate their length by means of seat pillar rails 18. In addition, reinforcing tubes 19 extend between the seat pillar rails 18 and the seat rails 17.

A dirigible front wheel 21 carrying a large, low pressure balloon tire 22 is carried at the lower end of a front fork assembly 20. The fork assembly 20 is, in turn, dirigibly supported by the head pipe 13 in a known manner and carries a handlebar 23 at its upper end for steering of the front wheel and tire 21, 22.

A rear wheel 24 carries a large, low pressure balloon tire 25. The tire 25 is at least equal to the width of the frame assembly 12 and may be larger in width than the frame assembly 12. The rear wheel and tire assembly 24, 25, is suspended by means of a trailing arm assembly, indicated generally by the reference numeral 26. The trailing arm assembly 26 has a pair of spaced apart arm portions 27 and 28 that are affixed to a tubular member 29 at their forward end. The tubular member 29 is supported for pivotal movement by means of a supporting assembly 31 carried by the frame assembly 12 and specifically in the area of the juncture between the frame tubes 16 and 18 for suspension movement of the rear wheel and tire 24, 25.

The suspension movement of the rear wheel tire assembly 24, 25 is controlled by means of a pair of combined coil spring and shock absorber assemblies 32. These coil spring and shock absorber assemblies are loaded between the trailing arm portions 27 and 28 and specifically brackets 33 affixed thereto and brackets 34 carried by the reinforcing tubes 19. It should be noted from FIGS. 2 and 3 that the combined spring and shock absorber assemblies 32 have their centers positioned inwardly from the outer periphery of the tire 25.

A power plant, indicated generally by the reference numeral 35, is supported by the frame assembly 12. The power plant 35 includes an internal combustion engine 36 which is provided with one or more carburetors 37 for supplying a charge to the chambers of the engine 36. The carburetor 37 draws air from an air cleaner 38 that is positioned within the frame 12 rearwardly of the engine 36.

The power plant 35 also has a combined crankcase and transmission assembly 39 in which a change speed gear box is provided that drives an output shaft 41.

A fuel tank 42 is carried by the frame assembly 12 and specifically by the main tube 14 rearwardly of the head pipe 13. Behind the fuel tank 42, there is positioned a rider's seat 43 that is designed so as to accommodate a single rider. The frame assembly is provided with a pair of foot pegs 44 on opposite sides of the power plant 35 so as to accommodate the feet of a rider seated upon the seat 43.

A rear fender assembly 44 is carried by the frame assembly 12 beneath the seat 43 and overlying at least in part the rear wheel tire assembly 24, 25.

The rear wheel tire assembly 24, 25 is driven by the engine output shaft 41 by means of a driving arrangement that includes a drive shaft, indicated generally by the reference numeral 45 and a final drive assembly, indicated generally by the reference numeral 46. The drive shaft 45 is contained within the trailing arm assembly 26, in a manner which will be described and which may be best understood by reference to FIG. 2.

Figure 2:
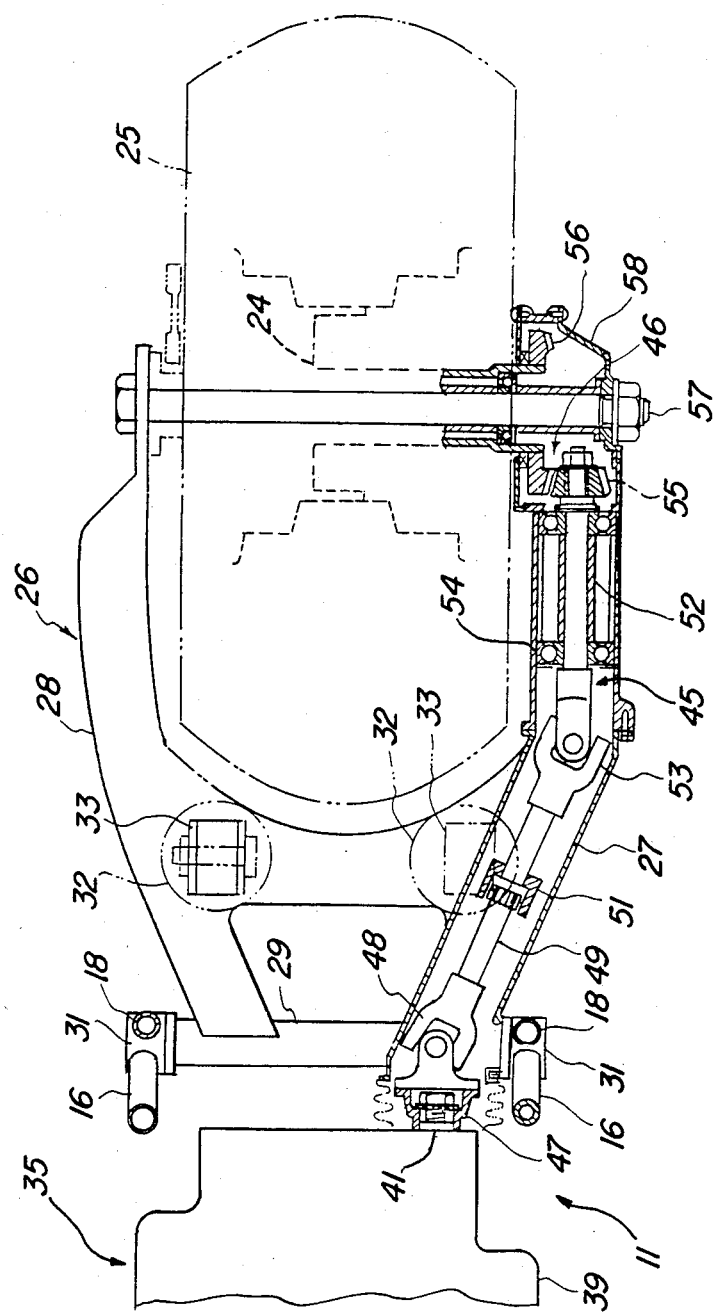
FIG. 2 is an enlarged top plan view showing the rear wheel supporting and driving mechanism.
Figure 3:
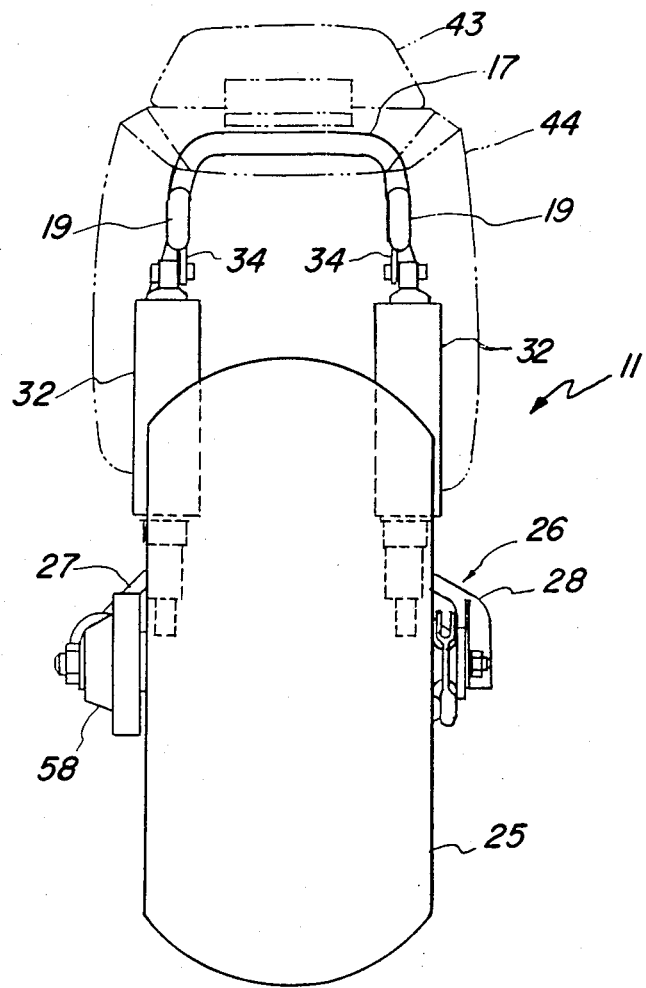
FIG. 3 is an enlarged rear elevational view of the motorcycle.

A coupling 47 connects the output shaft 41 to a first universal joint 48 that transfers the drive from the output shaft 41 to a first section 49 of the drive shaft 45. This first section 49 is disposed at an acute angle to a longitudinal plane containing the center of rotation of the rear wheel tire assembly 24, 25, when viewed in plan as seen in FIG. 2. A splined coupling 51 is positioned intermediate the ends of the drive shaft portion 49 so as to accommodate changes in length.

The drive shaft portion 49 is connected to a second drive shaft portion 52 by means of a second universal joint 53. The drive shaft portion 52 is supported for rotation within a tubular component 54 of the trailing arm portion 27 and extends parallel to the longitudinal center plane previously described.

The final drive 46 includes a pinion gear 55 that is affixed for rotation to the rear end of the drive shaft portion 52. The pinion gear 55 meshes with a ring gear 56 that is affixed to the hub of the rear wheel 24. This hub is rotatably journaled upon a shaft 57 that is carried at the rear end of the trailing arm portions 27 and 28. The ring and pinion gears 56 and 55 are contained within a final drive housing 58 formed at the rear end of the trailing arm portion 27.

It should be readily apparent from the foregoing description that an extremely effective final drive arrangement is provided that transfers the drive from an inwardly placed engine output shaft 41 to a ring gear that is positioned laterally outwardly from this outward shaft through the articulated drive shaft. Since the drive shaft is contained within the trailing arm assembly, it will be protected when traveling over rough terrain and in sandy territory or in marshy lands. Thus, an extremely effective and yet compact drive arrangement is provided.

It is to be understood that the foregoing description is that of a preferred embodiment of the invention and that various changes and modifications may be made without departing from the spirit and scope of the invention, as defined by the appended claims.

We claim:

1. In a motorcycle having frame means, a front wheel dirigibly supported by said frame means, power means supported by said frame means and driving an output shaft, and a rear wheel suspended by said frame means through trailing arm means and carrying a low pressure balloon tire having a width at least equal to the width of said frame means, the improvement comprising said trailing arm means having a tubular portion extending along one side of said frame means and comprised of a first, forward part disposed at an angle to a longitudinal plane passing through the center of said rear wheel in plan view and a second, rearward part disposed parallel to said plane and lying on one side of said rear wheel, means for driving said rear wheel from said output shaft including a drive shaft having at least a first portion rotatable within said forward part of said tubular portion and a second portion rotatable within said rearward part of said tubular portion.

2. In a motorcycle as set forth in claim 1 wherein the engine output shaft rotates about an axis that is disposed laterally inwardly from the outer periphery of the rear wheel.

3. In a motocycle as set forth in claim 1 wherein the drive shaft portions are connected to each other by a universal joint and are connected to the engine output shaft by a universal joint, the last named universal joint lying on the pivot axis of the trailing arm.

4. In a motorcycle as set forth in claim 3 further including ring and pinion gears for driving said rear wheel from said second drive shaft portion, said ring and pinion gear being contained within said trailing arm means.

* * * * *